July 21, 1964 L. G. MILLER 3,141,431
THREAD CUTTER MECHANISMS
Filed June 29, 1961 7 Sheets-Sheet 1

Inventor
Lloyd G. Miller
By his Attorney
Robert E. Ross

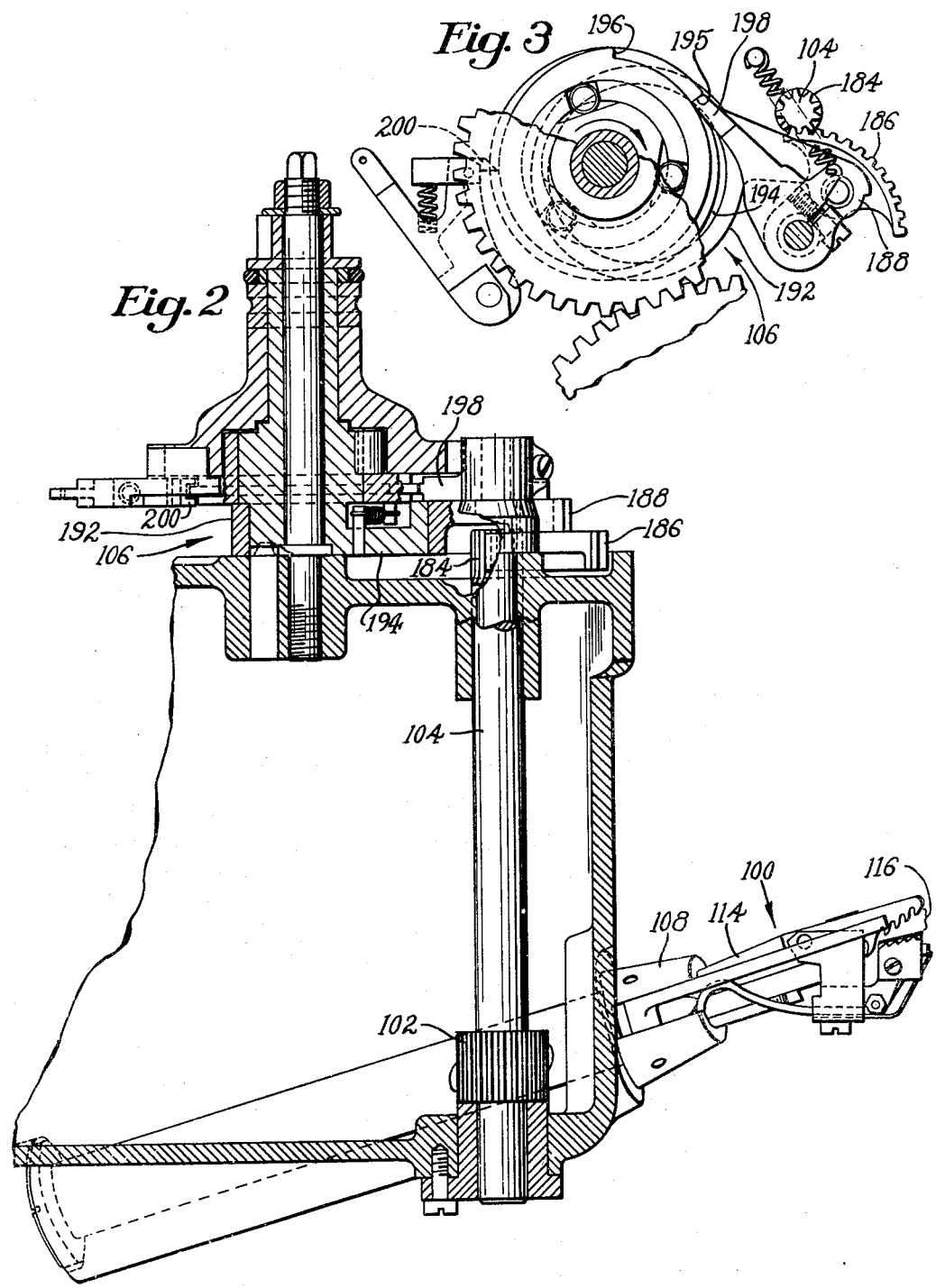

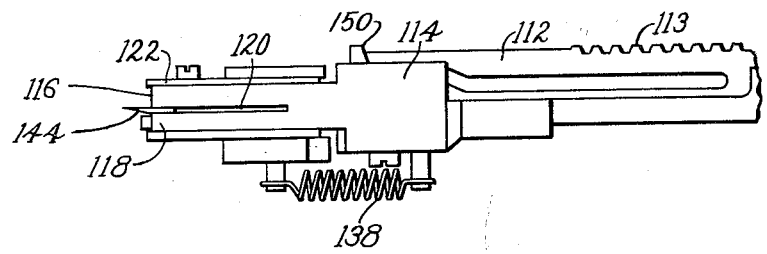
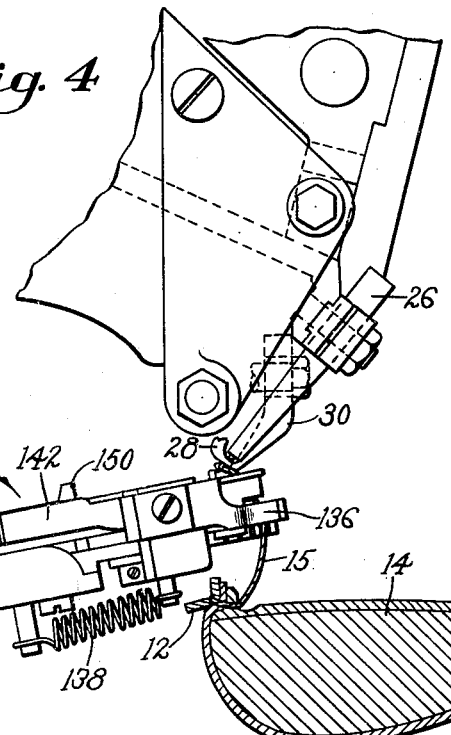
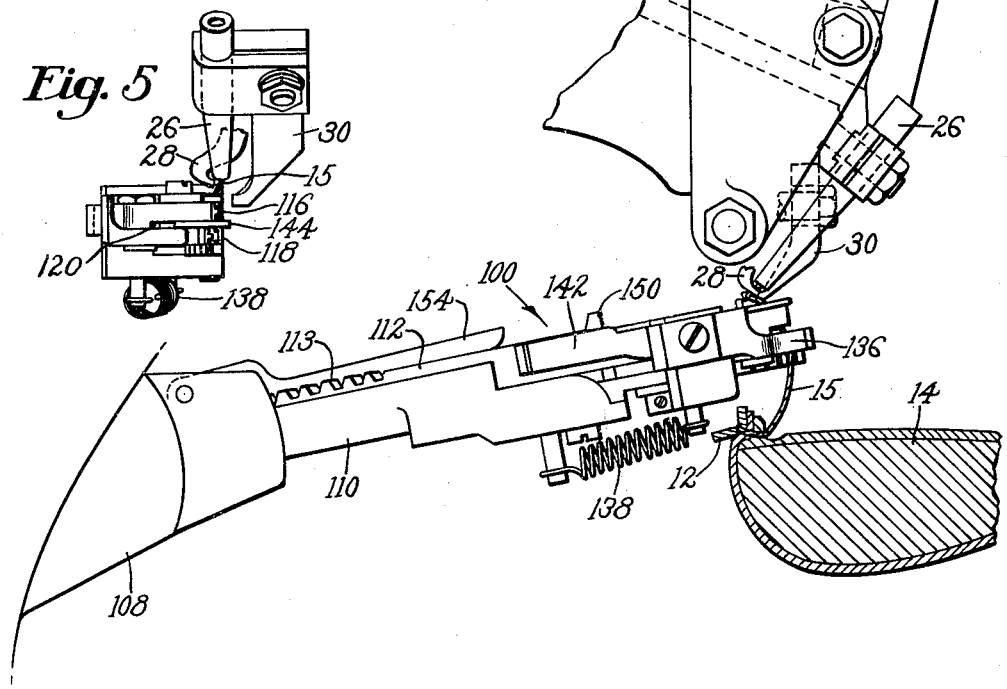

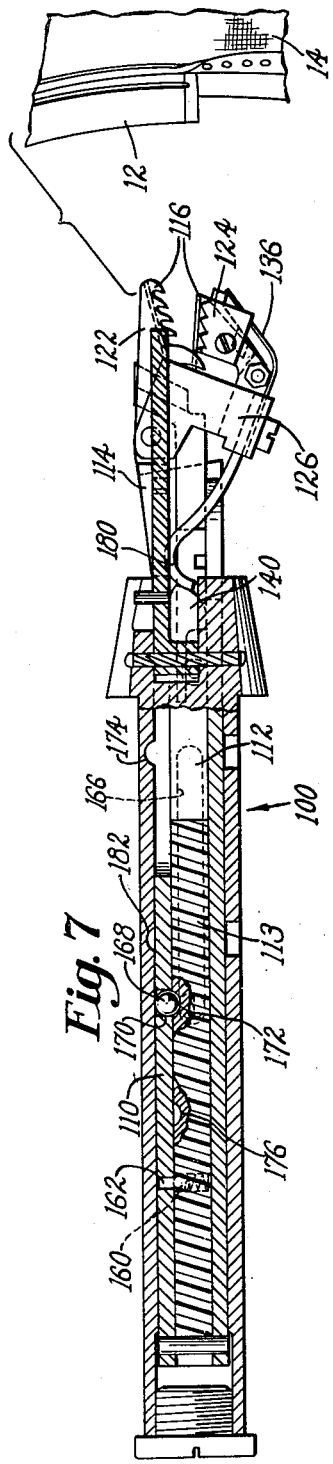
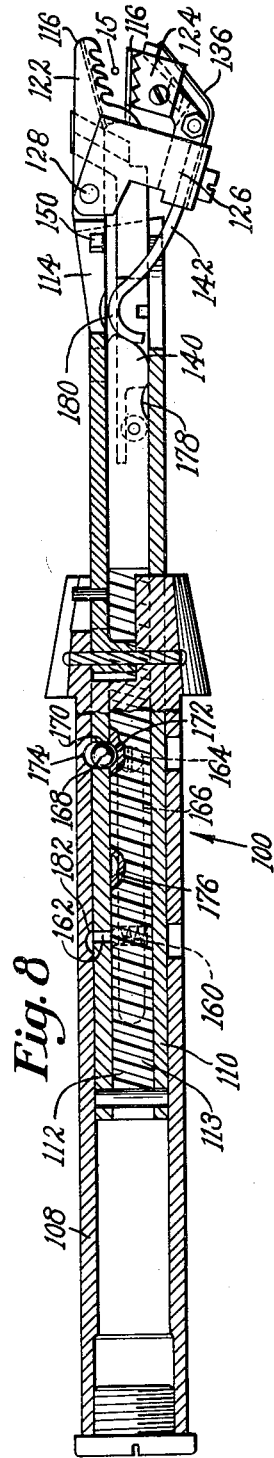
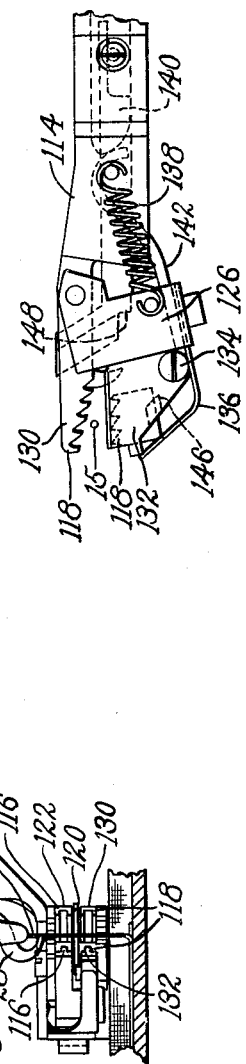
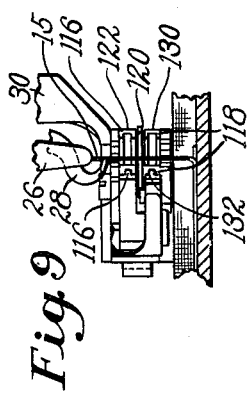

July 21, 1964    L. G. MILLER    3,141,431
THREAD CUTTER MECHANISMS

Filed June 29, 1961    7 Sheets-Sheet 5

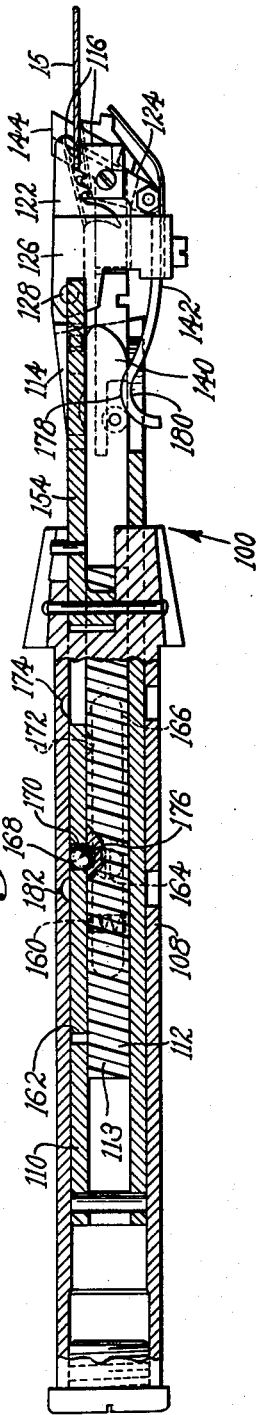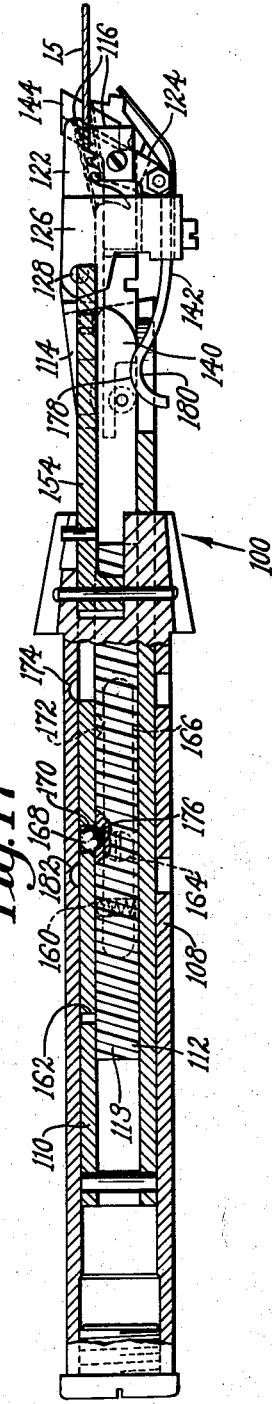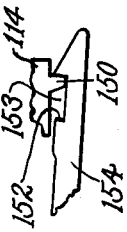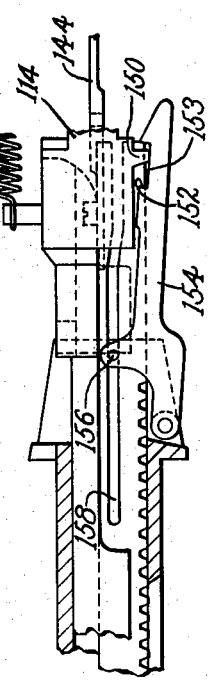

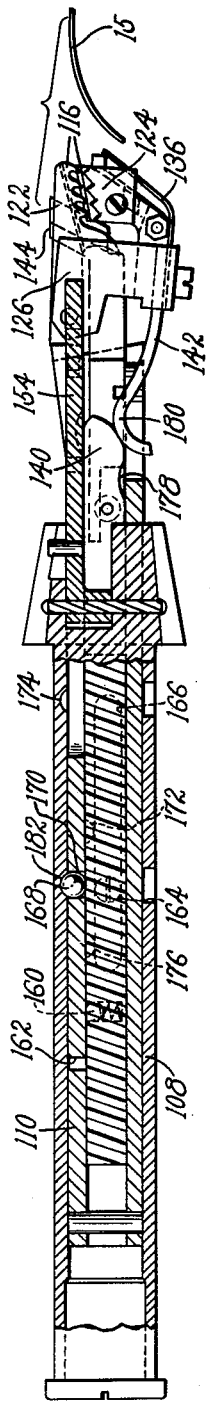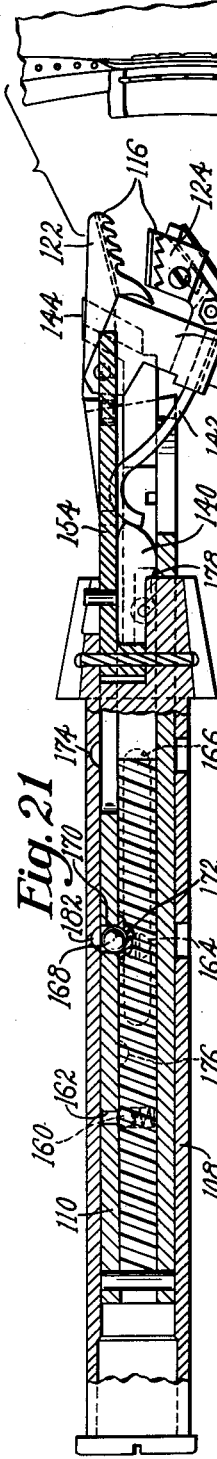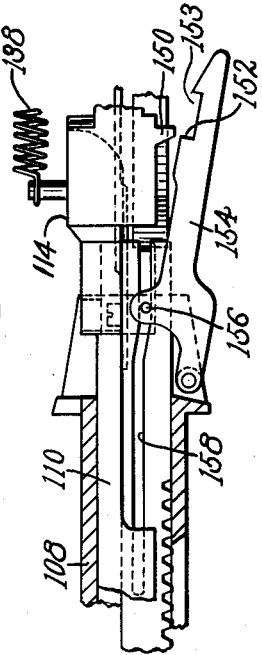

United States Patent Office 3,141,431
Patented July 21, 1964

3,141,431
THREAD CUTTER MECHANISMS
Lloyd G. Miller, Beverly, Mass., assignor to United Shoe Machinery Corporation, Boston, Mass., a corporation of New Jersey
Filed June 29, 1961, Ser. No. 120,713
4 Claims. (Cl. 112—252)

This invention relates generally to machines for the manufacture of shoes and has particular reference to a thread cutting mechanism for use with a sewing machine.

The invention is illustrated herein as being applied to a Goodyear welt and inseam sewing machine of the type shown in United States Letters Patent No. 2,900,933, issued August 25, 1959, to J. P. Carter, and embodies certain features shown in United States Letters Patent No. 2,220,112, issued November 5, 1940, and United States Letters Patent No. 1,971,575, issued August 28, 1934, to A. R. Morrill. This patent and the patents referred to therein may be referred to for a description of certain parts of the machine which are associated with the mechanism embodying the invention to be described hereinafter.

It has been considered desirable to reduce the degree of operator skill required to operate a welt sewing machine of the type shown in the above patents and to this end the Carter patent discloses means for automatically actuating the welt cutter near the completion of an attaching operation. Further to automate the operation there is disclosed in an application Serial No. 92,251, filed February 28, 1961 (now Patent No. 3,068,815), by the present inventor means for causing the actuation of the welt cutter to terminate automatically the attaching operation.

However, after the welt attaching operation has been completed, either by the operator, or automatically by the machine, the shoe being operated on is still attached to the machine by the thread used to attach the welt. With the machine above described, it is necessary for the operator to remove the shoe from the sewing mechanism of the machine, drawing thread from the thread supply, and then to cut the thread either manually with a knife, or by passing the thread into a stationary thread cutter mounted in the machine frame. In either case there is a possibility of damage to the shoe by marking or scarring the exterior surface during the cutting operation.

The objection of the present invention is to provide a thread cutter that operates automatically on termination of the attaching operation.

A further object of the invention is to provide a thread cutter adapted to release the end of the thread extending to the shoe, after the cutting operation, while continuing to grip the end of the thread extending to the thread supply.

A further object of the invention is to provide a thread cutter for the above purpose that has means operable after a cutting operation to co-operate with the sewing mechanism to enable the first stitch applied to the next attaching operation to be tightened.

Other objects of the invention will be apparent to one skilled in the art from the following detailed description of a specific embodiment thereof.

FIG. 2 is a plan view, partly in section and on an enlarged scale, of a thread cutter driving mechanism of the machine of FIG. 1 with certain parts omitted for clarity;

FIG. 3 is a fragmentary view in left side elevation of clutch mechanism shown in FIG. 2;

FIG. 4 is a view in left side elevation of the thread cutter and certain of the sewing devices of the machine of FIG. 1, with the thread cutter in the extended position;

FIG. 5 is a view of the devices of FIG. 4, as seen from the front of the machine;

FIG. 6 is a fragmentary view in right side elevation of the thread cutter mechanism in extended position;

FIG. 7 is a top plan view, partly in section of the thread cutter mechanism of the machine of FIG. 1, in partly retracted position;

FIG. 8 is a similar view of the thread cutter in a position subsequent to that of FIG. 7, in which the jaws have been extended to the thread cutting position;

FIG. 9 is a view in front elevation of the mechanism of FIG. 8;

FIG. 10 is a bottom plan view of the forward end of the mechanism of FIG. 8;

FIG. 15 is a sectional top plan view of the thread cutter mechanism in a stopped position of the machine subsequent to that of FIG. 12, in which the jaws have partially retracted, drawing thread from the thread supply of the machine as a stopped position is reached;

FIG. 16 is a right side sectional detail of a portion of the mechanism of FIG. 15 in upside down position, illustrating the operation of a latch mechanism;

FIG. 17 is a sectional top plan view similar to FIG. 15, in which the jaws have moved forwardly a small distance at the start of a new machine cycle to release the tension on the thread during the first stitch;

FIG. 18 is a right side detail in upside down position of a portion of the latch mechanism with the jaws advanced a short distance from that of FIG. 17;

FIG. 19 is a sectional top plan view of the thread cutter mechanism in a position subsequent to that of FIG. 17, in which the jaw mechanism has retracted and opened slightly to release the thread;

FIG. 20 is a right side detail of a portion of the latch mechanism in upside down position corresponding otherwise to the positions of the parts assumed in FIG. 19;

FIG. 21 is a sectional top plan view of the latch mechanism in a position subsequent to that of FIG. 19, in which the grippers are returning to their original position; and, FIG. 22 is a right side detail of the latch mechanism in upside down position, corresponding otherwise to the position of the parts assumed in FIG. 21.

Figure 1:
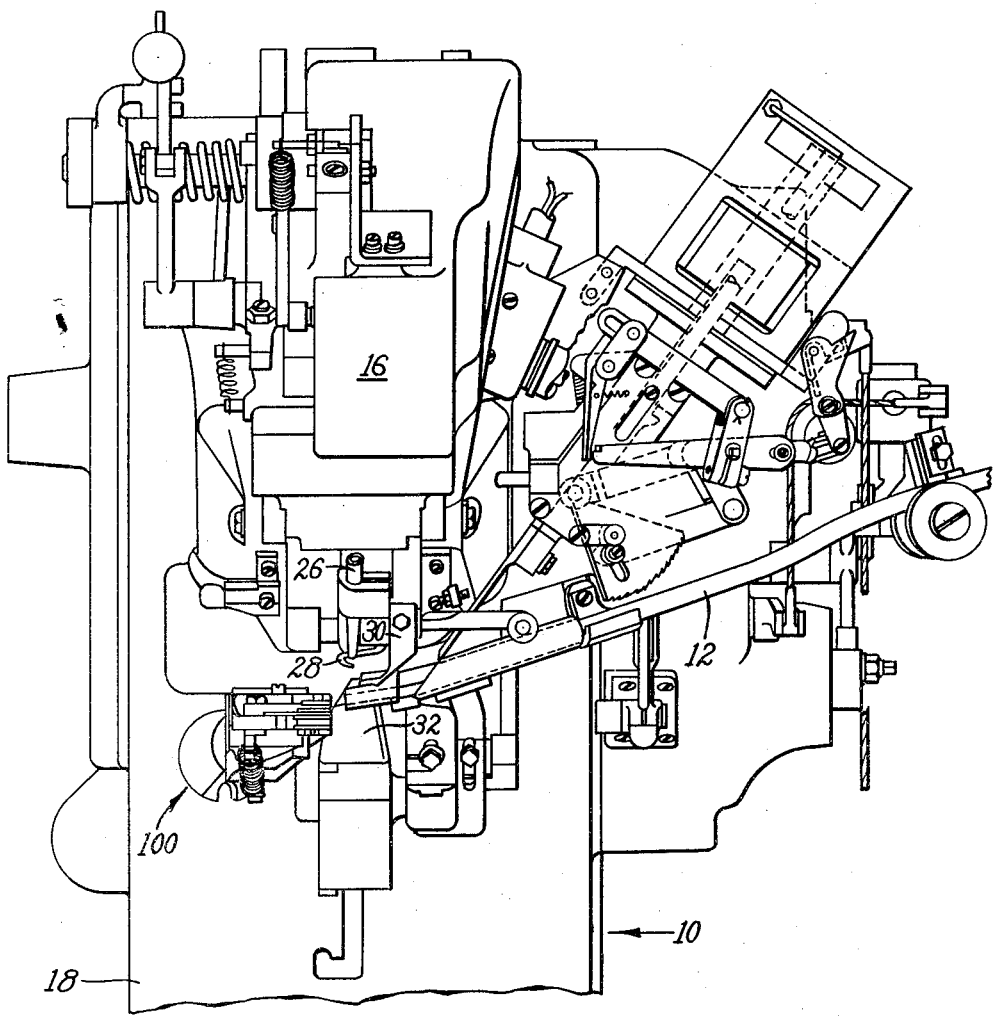
FIG. 1 is a front elevation of the operating head of a machine embodying a thread cutter and other features of the invention.

Referring to the drawings, there is illustrated a welt attaching machine 10 (FIG. 1) which is adapted to sew a welt 12 to the periphery of a partially fabricated shoe 14 by means of a thread 15 (FIG. 4).

The machine 10 comprises an operating head 16 supported in a pedestal 18, and may be provided with the usual operator controlled food treadle means (not shown) for actuating the machine starting mechanisms, as shown in the above identified patents.

The operating head 16 is similar to that shown in the above identified patents and has the usual stitch forming, shoe feeding, and welt feeding and guiding devices, a welt severing knife and mechanism for actuating said knife.

The stitch forming means includes the usual devices such as a looper 26, a thread finger 28, a channel guide 30, a back rest 32, a needle and awl (not shown) and other devices constructed and operating in the same manner as shown in the patents above referred to.

To sever the thread 15 extending between the shoe and the stitch forming devices at the termination of an attaching operation, a thread cutter mechanism 100 is provided in the machine, and is arranged to be operated by a pinion 102 (FIG. 2) on a shaft 104 which rotates in a predetermined manner in response to the action of a driving clutch mechanism 106, as will be described hereinafter.

The thread cutter 100 (FIG. 4) comprises generally an outer stationary housing 108, a hollow sleeve 110 slidable in the housing, and a knife carrier 112 slidable in the sleeve 110 and having a rack 113 disposed therein in engagement with the pinion 102.

The sleeve 110 carries on the foremost end a support block 114 (FIG. 6) having upper and lower sets of jaws 116 and 118 respectively which are arranged in alinement with each other and are separated by a cutting slot 120 (see FIGS. 6 and 9), the sleeve serving as a jaw carrier. The two jaw sets are adapted to grasp the thread at a position between the stitch forming devices and a shoe on which the welt attaching operation has been completed, with the upper set of jaws 116 grasping the portion of the thread extending to the sewing mechanism, and the lower set of jaws 118 grasping the portion of the thread extending to the shoe.

The upper set of jaws 116 comprises a fixed jaw portion 122 (FIG. 8) extending rigidly from the support block 114, and a movable jaw portion 124 secured to a pivot block 126, which is pivoted in turn to the support block 114 by a pivot 128. The lower set of jaws 118 comprises a fixed jaw portion 130 (FIG. 10) secured to the support block 114, and a movable jaw portion 132 which is pivotally mounted on the pivot block 126 at a pivot 134. The movable jaw portion 132 is normally biased into a position corresponding to that of the movable jaw portion 124, by means of a leaf spring 136, and when the jaws are closed, is capable of being pivoted away from the fixed jaw portion 130 by flexing of the spring 136, independently of movement of the pivot block 126 for a purpose to appear hereinafter. The pivot block 126 is normally biased rearwardly by a spring 138 to that both sets of jaws are maintained in the open position.

To provide means for causing the jaws to close and grip the thread, and means for cutting the thread, mechanism to be described hereinafter is provided for causing the sleeve 110 to move forwardly from the housing 108 at the appropriate time so that the jaws straddle the thread 15, and means is provided for thereafter causing the knife carrier 112 to move forwardly in relation to the sleeve. To cause the two sets of jaws to grip the thread during this latter movement, a cam 140 on the knife carrier 112 is positioned to engage the free end of resilient lever means comprising a leaf spring 142 secured to the pivot block 126, thereby causing said block to pivot and to close the jaws on the thread. To cut the thread after it has been gripped by the jaws, a knife 144 is provided in the forward end of the knife carrier 112 which is positioned to travel in the knife slot 120 and sever the thread between the two sets of jaws.

Figure 14:
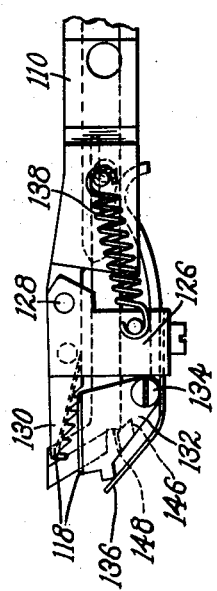
FIG. 14 is a similar view of the lower jaw portion of FIG. 12, in which the cutting knife has cut the thread and opened the lower jaws.
Figure 13:
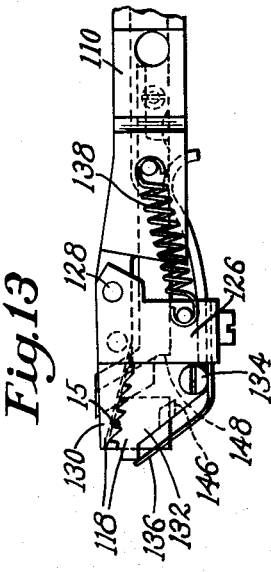
FIG. 13 is a bottom plan view of the lower jaw portions of FIG. 11 before the thread is severed.

After the thread has been cut, it is necessary to release the end of the portion of the thread attached to the shoe, and for this purpose an abutment 146 is provided on the pivotable jaw portion 132 positioned to be contacted by a lower corner forming a cam 148 of the end of the knife 138. Hence, in further forward movement of the knife after the thread has been cut, engagement of the jaw cam 146 by the knife cam 148 causes the jaw portion 132 to pivot away from its associated fixed jaw 130 releasing the end of the thread retained in the lower set of jaws 118, while the other end of the thread extending to the stitching mechanism continues to be gripped by the upper set of jaws 116 (see FIGS. 13 and 14).

During a subsequent portion of the cycle, the sleeve 110 and the knife carrier 112 are caused to retract together for a predetermined distance, so that during such simultaneous rearward movement the cam 140 on the knife carrier continues to bear against the spring 142 and maintains the jaws 116 in gripping engagement with the thread, thereby pulling thread from the thread supply of the machine.

In the illustrated embodiment of the invention, the above described portion of the cycle of operation of the thread cutter is caused to occur at the termination of the welt attaching operation. The action of the thread cutter may be initiated either automatically by the reversal of the sewing mechanism at the end of the attaching operation or manually by the operator by any movement mechanism, as will appear hereinafter.

At the termination of the above described portion of the cycle of operation of the thread cutter, the mechanism comes to rest with the sleeve and the knife carrier in the partially retracted position (see FIG. 15) until the machine 10 is again started to attach a welt to another shoe. At this time, pinion 102 again drives the rack and the knife carrier rearwardly; however, a boss 150 (FIGS. 16 and 18) on the support block 114 almost immediately engages an abutment 152 at one end of a recess 153 in a latch arm 154 pivoted to the housing 108, the sleeve thereby being prevented from moving rearwardly. Consequently, rearward movement of the knife carrier only in relation to the sleeve moves the knife back through the cutting slot 120, and allows both sets of jaws to open by reason of disengagement of the cam 140 in the knife carrier from the leaf spring 142 on the pivot block. After the knife carrier has retracted into the sleeve the desired distance, the latch arm 154 is caused to swing outwardly to release the abutment 152 from the boss 150, by means of a pin 156 in the arm riding in a cam track 158 in the knife carrier. Thereafter, the knife carrier and the sleeve move rearwardly together to their original position.

The sleeve and knife carrier are caused to move in relation to each other and in relation to the housing in response to the driving force imparted to the rack 113 by the pinion means now to be described.

During the first portion of the above-described cycle of operation the knife carrier and the sleeve move forwardly together to a position where the open jaws straddle the thread 100 between the shoe and the sewing mechanism. Such simultaneous movement is effected by means of a spring loaded ball 160 carried in the knife carrier 112 engaged in a recess 162 in the adjacent inner surface of sleeve 110. Hence, forward sliding movement is transferred from the knife carrier to the sleeve through said ball 160.

Figure 11:
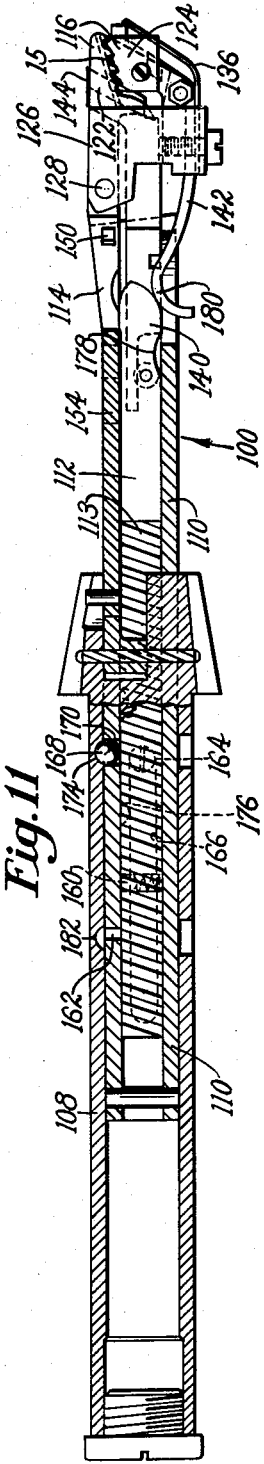
FIG. 11 is a sectional top plan view of the thread cutter in a position subsequent to that of FIG. 8 in which the jaws have gripped the thread.
Figure 12:
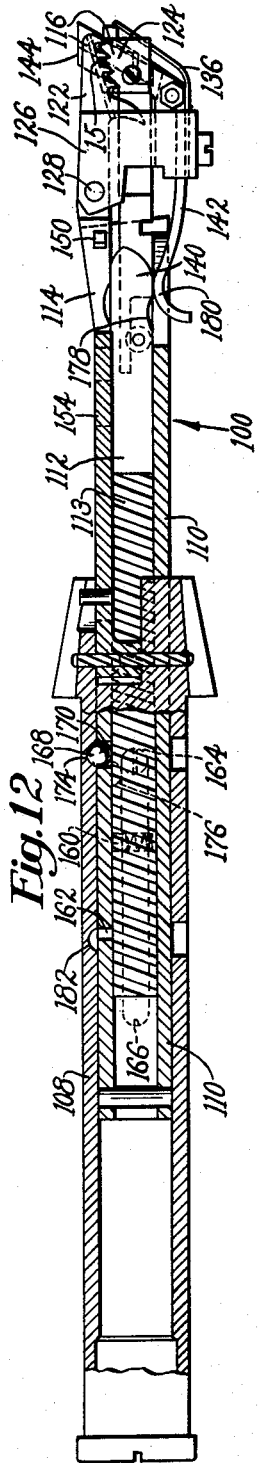
FIG. 12 is a similar view of the thread cutter in a position subsequent to that of FIG. 11 in which the cutting knife has moved forwardly to cut the thread.

When the sleeve and knife carrier have moved forwardly the desired distance, a stop 164 in the form of a screw in the sleeve, which screw travels in a slot 166 in the housing, reaches the end of the slot and prevents further outward movement of the sleeve. On further outward movement of the knife carrier, the spring loaded ball 160 is disengaged from the recess 162, and a locking ball 168, which is disposed in an aperture 170 in the sleeve wall and an adjacent recess 172 in the knife carrier, becomes aligned with a recess 174 in the housing, and is forced into said recess 174 by the knife carrier, so that the knife carrier is free to move forwardly in relation to the sleeve, and the sleeve is locked by the ball 168 in relation to the housing (see FIG. 11). The knife carrier continues its outward movement to the position of FIG. 12 to accomplish the gripping and cutting of the thread in the manner previously described and at the end of the outward travel of the carrier, another recess 176 therein becomes aligned with the locking ball 168. Shortly after this time the lower jaws release the thread connected to a sewn shoe and the direction of rotation of the pinion 102 reverses by means to be described hereinafter, so that thereafter the movement of the knife carrier is rearwardly, and as previously described during the initial portion of such rearward movement the sleeve must also move rearwardly so that the upper pair of jaws remain closed while thread is being pulled from the thread supply. To effect such rearward movement of the sleeve the jaw closing cam 140 in the knife carrier is provided with a recess 178, and the jaw closing leaf spring 142 is provided with an inwardly curved portion 180 which seats in the recess 178 when the knife carrier is in the fully forward position (see FIGS. 15 and 17). Hence, on rearward movement of the knife carrier from the forward position the sleeve 110 is also forced rearwardly, so that the locking ball 168 is forced to transfer from the recess in the housing to the recess 176 in the knife carrier. As previously described, the mechanism comes to rest in the position of FIG. 15, until the machine is again started to commence the attachment of a welt to the next shoe. At this time the boss 150 has entered the recess 153 in the arm 154; however, it has not yet contacted the abutment (see FIG. 16).

When the machine is again started, the pinion continues to drive the knife carrier rearwardly, and the boss 150 contacts the abutment 152. At the same time, the locking ball 168, being carried rearwardly by the sleeve, arrives at a point opposite a rear recess 182 in the housing. Rearward movement of the sleeve is then stopped by the abutment 152. However, the knife carrier continues moving rearwardly forcing the ball outwardly into the housing recess 182 (FIG. 19), so that the sleeve is again locked in relation to the housing. As the knife carrier continues to move rearwardly to its original position the cam 140 disengages from the leaf spring 142 permitting the jaws to open to their original position.

As illustrated in FIG. 3 the thread cutter may conveniently be driven through its cycle by the shaft 104, which carries a pinion 184 on the end remote from the pinion 102 and the thread cutter. The pinion 184 is driven by a toothed segment 186 on a rock-shaft 188 which is oscillated back and forth by a strap disposed on an eccentric 194 driven by the Horton clutch 106 in the manner illustrated in the Morrill patent referred to above.

In the illustrative embodiment the clutch 106 is provided with two stop abutments 195 and 196 and two stopping latches 198 and 200 for co-operation with the abutments to stop the rotation of the eccentric and consequently stop the motion of the thread cutter in two predetermined positions. The latch 198 is disposed in engagement with the stop abutment 195 during the welt attaching operation, so that the thread cutter mechanism is is held in retracted position. At the end of a welt attaching operation the latch 198 is released from the stop 195 by any convenient means thereby permitting the clutch eccentric to rotate through about 270° until the stop abutment 196 engages the second stop latch 200. During this portion of the clutch revolution the thread cutter mechanism is extended by the rotation of shaft 104 to cut the thread and then is partially retracted stopping in the position of FIG. 15 as previously described. On the start of the next welt stitching operation the latch 200 remains momentarily in engagement with the abutment 196 during which time the first stitch is made. As the thread is pulled through the welt during said first stitch, the jaw mechanism is permitted to move forwardly a short distance to give up a portion of the thread to form said stitch, with said distance being limited by the abutment 150 in the recess 153 of the arm 154 (see FIGS. 17 and 18). Thereafter the latch 200 is released automatically in any convenient manner so that the clutch eccentric can rotate until the stop 194 again engages the latch 198 during which rotation the jaw mechanism is retracted to its original position. During the first portion of the resulting rearward jaw movement, the jaws 116 retain their grip on the thread, until the cam 140 moves rearwardly far enough to become disengaged from the leaf spring 142 to permit the jaws to open. Hence the thread is pulled a short distance rearwardly during this portion of the cycle, to tighten the first stitch made in the welt. Excessive tightness is prevented by the fact that the jaws are held together by the spring tension of leaf spring 142 so that undue tension will not break the thread, but will cause it to pull through the jaws. Further rearward movement of the mechanism causes the cam 140 to become disengaged from the leaf spring 142 in the manner previously described, so that the jaws are permitted to open and the thread released.

Although in the illustrated embodiment the thread cutter mechanism is particularly adapted for use with a welt stitcher it will be apparent that the invention may be readily adapted for use with any type of machine in which it is necessary to cut a thread, string, cord, or the like.

Since certain other obvious changes may be made in the device without departing from the scope of the invention it is intended that all matter contained herein be interpreted in an illustrating and not in a limiting sense.

Having thus described by invention, what I claim as new and desire to secure by Letters Patent of the United States is:

1. A thread cutter mechanism comprising a pair of thread gripping means and a thread cutter adapted to cut the thread by a forward cutting stroke, means actuated by the thread cutter during initial portion of the forward cutting stroke for causing both of said thread gripping means to grip the thread, means actuated by the thread cutter during the final portion of the cutting stroke for causing one of said pair of thread gripping means to release the thread, means for thereafter causing retraction of the thread cutting means, and means locking the thread gripping means to the cutting means during the initial portion of the retraction thereof.

2. A thread cutter, comprising spaced pairs of thread gripping jaws, means moving said jaws forwardly to straddle a thread to be cut, knife means adapted to move between the pairs of jaws to cut said thread, means responsive to the initial portion of the cutting stroke of the knife to cause said pairs of jaws to close and grip the thread, and means responsive to the final portion of the cutting stroke of the knife to release the thread from one of said pairs of jaws, and means thereafter retracting said jaws while the other pair of jaws continues to grip the thread.

3. A thread cutter mechanism comprising a housing, a sleeve slidable in the housing and carrying a pair of sets of spaced thread gripping jaws on the forward end, and a knife carrier slidable in the sleeve which carries the jaws, a knife on the carrier disposed between the sets of jaws and adapted to be moved forwardly with respect to the jaws to cut a thread gripped by the jaws, resilient lever means for closing said jaws, and means on said knife carrier engaging said resilient lever means to close said jaws on the forward movement of the knife carrier with relation to the sleeve and to cause said jaws and the sleeve to retract together with the knife carrier on subsequent rearward movement thereof.

4. A thread cutter mechanism comprising a housing, a jaw carrier and a knife carrier slidable in said housing, and having a forwardly projecting knife, said jaw carrier having a pair of sets of thread gripping jaws disposed on the forward end, means driving said knife carrier and said jaw carrier forwardly until said jaws straddle a thread to be cut, means thereafter moving said knife carrier forwardly in relation to said jaw carrier, means responsive to the initial portion of said movement to cause said jaws to close and grip the thread, means responsive to the final portion of said movement to cause one of said sets of jaws to open and release the thread therefrom, means for thereafter causing said knife carrier to move rearwardly, and means locking said jaw carrier to the knife carrier during the initial portion of said rearward movement so that the thread is continued to be gripped by the other set of jaws during said rearward movement.

References Cited in the file of this patent

UNITED STATES PATENTS

| | | |
|---|---|---|
| 1,197,886 | Zaleski | Sept. 12, 1916 |
| 1,214,108 | Zaleski | Jan. 30, 1917 |
| 1,262,189 | Froehlich | Apr. 9, 1918 |
| 1,341,061 | Latham | May 25, 1920 |
| 1,683,689 | Morrill | Sept. 11, 1928 |
| 1,971,575 | Morrill | Aug. 28, 1934 |